US011170068B2

(12) United States Patent
Shao

(10) Patent No.: US 11,170,068 B2
(45) Date of Patent: *Nov. 9, 2021

(54) METHOD AND SYSTEM FOR STARTING APPLICATION

(71) Applicant: Advanced New Technologies Co., Ltd., George Town (KY)

(72) Inventor: Mingbo Shao, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/186,161

(22) Filed: Nov. 9, 2018

(65) Prior Publication Data

US 2019/0095541 A1 Mar. 28, 2019

Related U.S. Application Data

(63) Continuation of application No. PCT/CN2017/083023, filed on May 4, 2017.

(30) Foreign Application Priority Data

May 11, 2016 (CN) .......................... 201610312307.4

(51) Int. Cl.
*G06F 16/958* (2019.01)
*G06F 16/00* (2019.01)
*G06F 16/955* (2019.01)

(52) U.S. Cl.
CPC ............ *G06F 16/972* (2019.01); *G06F 16/00* (2019.01); *G06F 16/9566* (2019.01)

(58) Field of Classification Search
None
See application file for complete search history.

(56) References Cited

U.S. PATENT DOCUMENTS

| 8,769,524 | B2 * | 7/2014 | Bhullar | G06F 9/44521 |
| | | | | 717/173 |
| 9,203,891 | B2 * | 12/2015 | Bilange | G06F 9/54 |
| 9,338,007 | B1 * | 5/2016 | Doshi | H04L 63/0815 |
| 9,355,186 | B2 * | 5/2016 | Khanna | G06F 16/972 |
| 2005/0021767 | A1 * | 1/2005 | Cai | G06F 9/485 |
| | | | | 709/228 |

(Continued)

FOREIGN PATENT DOCUMENTS

| CN | 105897902 | 8/2010 |
| CN | 102118504 | 7/2011 |

(Continued)

OTHER PUBLICATIONS

International Search Report by the International Searching Authority issued in International Application No. PCT/CN2017/083023 dated Jul. 6, 2017; 9 pages.

(Continued)

*Primary Examiner* — Howard Cortes
(74) *Attorney, Agent, or Firm* — Fish & Richardson P.C.

(57) ABSTRACT

A first local application (APP) opens a web page. The first local APP wakes a second local APP. The second local APP starts a local server. The first local APP sends a reference request to the local server. If a response returned by the local server is received, the first local APP stops a jump to a directed download page.

18 Claims, 2 Drawing Sheets

(56) References Cited

U.S. PATENT DOCUMENTS

| | | |
|---|---|---|
| 2005/0171950 A1 | 8/2005 | Dumitru et al. |
| 2009/0132690 A1* | 5/2009 | Hafez ............... G06F 8/61 709/223 |
| 2010/0083102 A1 | 4/2010 | Jimenez et al. |
| 2010/0229045 A1* | 9/2010 | Schultz ............. G06F 8/60 714/37 |
| 2011/0016382 A1* | 1/2011 | Cahill ............... G06F 40/14 715/234 |
| 2011/0283259 A1* | 11/2011 | Lawson ............. H04M 15/68 717/121 |
| 2012/0317172 A1* | 12/2012 | Redpath ............ H04L 67/04 709/203 |
| 2014/0006517 A1* | 1/2014 | Hsiao ............... G06Q 50/01 709/205 |
| 2014/0032707 A1* | 1/2014 | Doshi ............... G06F 9/542 709/217 |
| 2015/0030146 A1* | 1/2015 | Liu ................. H04M 1/72561 379/201.04 |
| 2016/0080308 A1* | 3/2016 | Li ................... H04L 51/32 709/206 |
| 2016/0156629 A1* | 6/2016 | Yasaki ............. G06F 13/102 726/4 |
| 2016/0253481 A1* | 9/2016 | Tian ............... H04L 63/08 726/7 |
| 2016/0261461 A1* | 9/2016 | Vaananen ......... H04L 29/08 |
| 2016/0286591 A1* | 9/2016 | Yasaki ............. H04W 4/70 |
| 2017/0085609 A1* | 3/2017 | Clay ............... H04L 65/4069 |
| 2017/0192766 A1 | 7/2017 | Sogani |
| 2017/0193221 A1* | 7/2017 | Liu ................. G06F 16/00 |
| 2018/0144063 A1* | 5/2018 | Chen ............... G06F 16/951 |
| 2019/0268490 A1* | 8/2019 | Sato ............... H04N 1/0048 |

FOREIGN PATENT DOCUMENTS

| | | |
|---|---|---|
| CN | 102137123 | 7/2011 |
| CN | 102694866 | 9/2012 |
| CN | 103810033 | 5/2014 |
| CN | 104809213 | 7/2015 |
| CN | 105119894 | 12/2015 |
| JP | 2012529699 | 11/2012 |
| JP | 2013182407 | 9/2013 |
| JP | 2015501496 | 1/2015 |
| JP | 2016504694 | 2/2016 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Extended European Search Report in European Application No. 17795482.3, dated Nov. 12, 2019, 7 pages.

PCT International Preliminary Report on Patentability in International Application No. PCT/CN2017/083023, dated Nov. 13, 2018, 9 pages (with English translation).

Pent.com [online], "JavaScript JSONP", Aug. 22, 2014, retreived on May 12, 2021, retreived from URL<http://www.ipentec.com/document/javascript-using-jsonp> 10 pages (with english machine translation).

www.getfilecloud.com [online], "Use Netstat Application to See Listening Ports in Windows," May 31, 2016, retrieved on Sep. 7, 2021, retrieved from URL <https://www.getfilecloud.com/blog/2016/05/how-to-find-what-application-is-listening-on-a-tcpip-port-in-windows-using-netstat/#, YTcQ-o4zZ21>, 9 pages.

* cited by examiner

METHOD AND SYSTEM FOR STARTING APPLICATION

CROSS-REFERENCE TO RELATED APPLICATIONS

This application is a continuation of PCT Application No. PCT/CN2017/083023, filed on May 4, 2017, which claims priority to Chinese Patent Application No. 201610312307.4, filed on May 11, 2016, and each application is hereby incorporated by reference in its entirety.

TECHNICAL FIELD

The present application relates to the field of computer software technologies, and in particular, to a method and system for starting an application.

BACKGROUND

Platforms for mobile devices can provide applications (APPs) developed based on operating systems of the mobile devices, to implement various user-oriented functions. For example, the iOS platform of Apple provides mobile device APPs developed based on the iOS system, the ANDROID platform of Google provides mobile device APPs developed based on the Android system, and the Windows mobile device platform provides mobile device APPs developed based on the Windows system.

APPs on such mobile device platforms can be started by using other APPs. For example, a short message service (SMS) message received by an SMS APP includes a uniform resource locator (URL) address. After a user taps the URL address in the SMS message, the mobile device can open a web page. The web page can be opened by using the default browser in the mobile device. For another example, local APP A (for example, a ticket purchase APP) on a mobile device can open a payment page during payment transaction by using the WebView component integrated in local APP A, and further start local APP B (for example, a payment APP) on the payment page.

For example, a certain SMS message in an SMS APP of a mobile device may include a link address of ALIPAY. After a user taps the link address in the SMS message, the mobile device can open a page corresponding to the link address by using the default browser. On the page, attempts can further be made to invoke local APP B (for example, the ALIPAY Wallet APP) through Scheme URI so that the user can perform operations in the ALIPAY Wallet APP. Scheme URI is a system-level resource location method, and supports Android, iOS, and Windows mobile platform systems. In the example above, after the ALIPAY Wallet APP is invoked, pages opened by browser APPs in most mobile platform systems are not closed but jump to APP download pages after a short period of time. As such, even though the ALIPAY Wallet APP has been installed on the mobile device, a page that the browser jumps to still displays a prompt, instructing the user to download the ALIPAY Wallet APP.

For another example, local APP A on the mobile device can be operated to open a link address of merchandise on TAOBAO, such as local APP A can open a page corresponding to the link address by using the WebView component of local APP A. On the page, attempts can further be made to invoke local APP B (for example, the TAOBAOAPP) through Scheme URI so that the user can perform operations in the TAOBAOAPP. Similarly, in the example above, after the TAOBAOAPP is invoked, pages opened by the WebView component in local APP A in most mobile platform systems are not closed, but jump to APP download pages after a short period of time. As such, even though the TAOBAOAPP has been installed on the mobile device, a page that the WebView component jumps to still displays a prompt, instructing the user to download the TAOBAOAPP.

It can be seen that, in the existing technology, after a web page is opened and a corresponding APP is invoked, the opened web page cannot know that the corresponding APP has been installed on the mobile device. Therefore, mobile devices are directed to APP download pages regardless of whether corresponding APPs have been installed on the mobile devices. A communication process is prolonged, resources are wasted, and user experience is affected.

SUMMARY

An objective of implementations of the present application is to provide a method and system for starting an application (APP) so that an opened page can confirm that a corresponding APP has been installed on a terminal device where the opened page resides.

To resolve the foregoing technical problem, the implementations of the present application are implemented as follows:

A method for starting an APP includes the following: a first local APP opens a web page and invokes a second local APP; the second local APP starts a local server; the first local APP sends a JavaScript (JS) reference request to the local server; and the first local APP stops jumping to a directed download page if receiving a response returned by the local server.

A system for starting an APP, includes the following: a first local APP, configured to open a web page and invoke a second local APP; further configured to send a JS reference request to the local server; and further configured to stop jumping to a directed download page when receiving a response returned by the local server; the second local APP, configured to start the local server; and the local server, configured to receive the JS reference request sent by the first local APP, and return the response to the first local APP when receiving the JS reference request.

It can be seen from the technical solutions provided in the implementations of the present application that, after the second local APP starts the local server, the local server can respond to a request sent by another APP even if the other APP and the second local APP reside in different processes. As such, the local server can return the response if it receives the JS reference request sent by the first local APP. If the response returned by the local server is received, the first local APP can determine that the invoked second local APP has started the local server. In other words, the second local APP has been invoked, and the first local APP does not need to jump to a certain directed download page. Further, the first local APP can stop jumping to the directed download page.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description show merely some implementations of the present application, and a person of ordinary skill in the art can still derive other drawings from these accompanying drawings without creative efforts.

DESCRIPTION OF IMPLEMENTATIONS

The implementations of the present application provide a method and system for starting an application (APP).

To make a person skilled in the art understand the technical solutions in the present application better, the following clearly and completely describes the technical solutions in the implementations of the present application with reference to the accompanying drawings in the implementations of the present application. Apparently, the described implementations are merely some rather than all of the implementations of the present application. All other implementations obtained by a person of ordinary skill in the art based on the implementations of the present application without creative efforts shall fall within the protection scope of the present application.

In the existing technology described above, a web page opened by a browser or a web page opened by using the WebView component of local APP A (for example, the previously described browser APP or ticket purchase APP) generally differs from local APP B that is invoked. Moreover, the browser or local APP A and local APP B reside in different processes. There is no inter-process communication method for the invoking process in the existing technology. Therefore, local APP A cannot know that local APP B has been invoked and local APP A still jumps to a directed download page of APP B.

Figure 1:
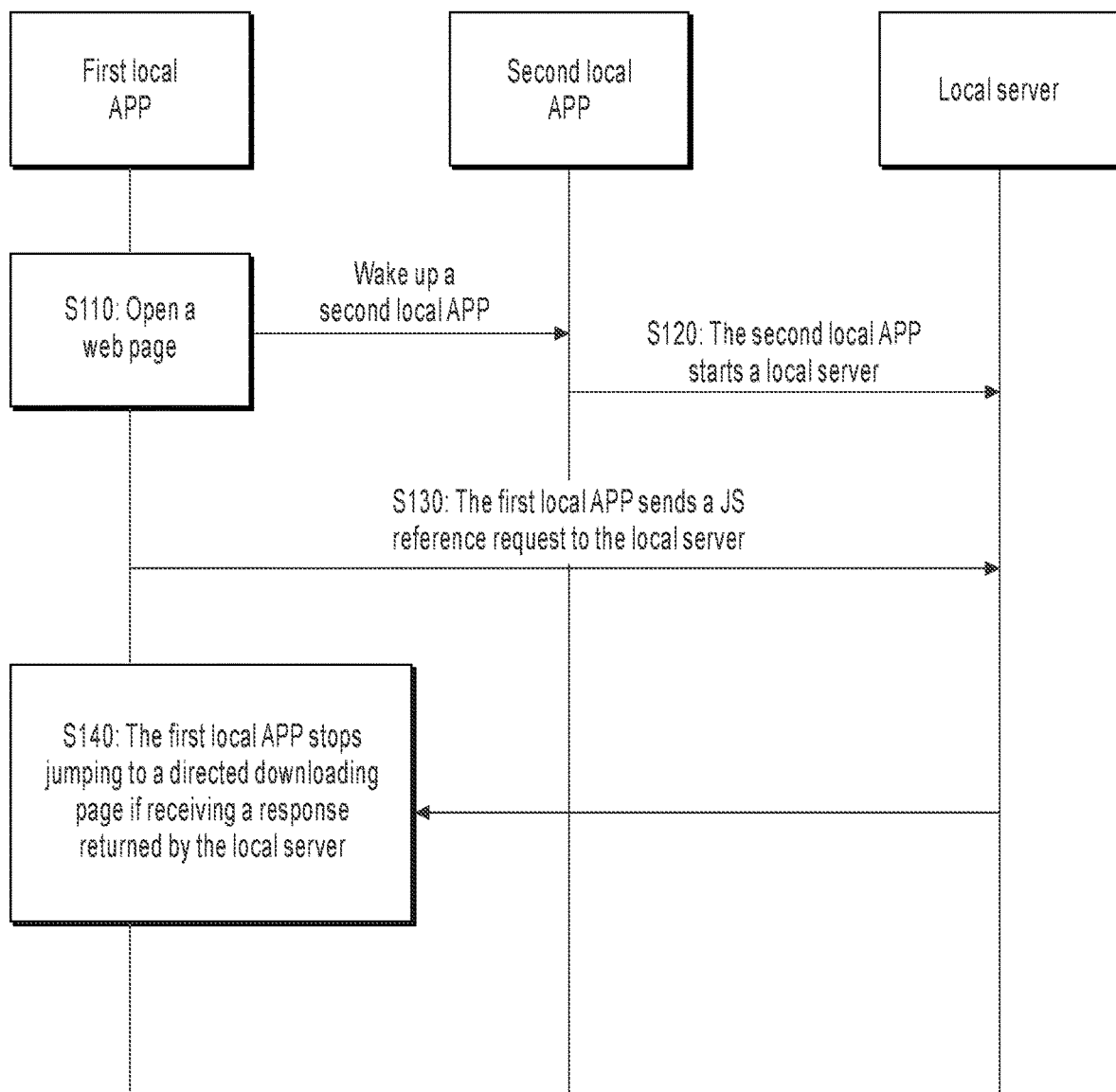
FIG. 1 is a flowchart illustrating a method implementation for starting an application, according to the present application.

An implementation of the present application provides a method for starting an APP. FIG. 1 illustrates a flow of implementing the implementation. As shown in FIG. 1, the method includes the following:

S110. A first local APP opens a web page and invokes a second local APP.

When a link address of the web page is triggered and opened through operations such as tapping, the corresponding web page can be loaded to a browser APP or a process of the WebView component of a local APP. The browser APP or the WebView component of the local APP can combine parameters included in the address of the web page into a uniform resource identifier (URI). The URI is also referred to as a Scheme URI (or URI Scheme) or a custom Scheme URI. The URI is a naming structure of a uniform resource identifier, and can describe a resource. The resource is a broad concept, and can be a so-called web resource, a file on a local device, or a video on a network, etc. The URI can be the following forms:

http://write.blog.csdn.net/postedit/7313543
file :///c:/WINDOWS/clock.avi
Git://github.com/user/project-name.git
ftp://user1:1234@address
ed2k://
|file|%5BMAC%E7%89%88%E6%9E%81%E5%93%81%E9%A3%9E%E8%BD%A69%EF%BC%9A%E6%9C%80%E9%AB%98%E9%80%9A%E7%BC%89%5D.%5BMACGAME%5DNeed.For.Speed.Most.Wanted.dmg|40969338|2c55f0ad2cb7f6b296db94090b63e88e|h=ltcxuvnp24ufx25h2x7ugfaxfchjkwxa|/

Overall, for example, the URI has the following form:
scheme://host:[port]/path?queryKey=queryValue scheme indicates a scheme name, the previously described http, file, Git, and ed2k are all scheme names; host indicates a host address; path indicates a path; queryKey=queryValue indicates a query key value; and port indicates a port (optional).

For example, there is a short message service (SMS) message in an SMS APP, and content of the SMS message includes a link address in the following form:
http://www.alipay.com/custom.html?schemeUrl=zmVerify%3a%2f%schemeApi%2fstartApp%3fbundleId%3d2000118%26version%3d1.5.1
zmVerify%3a%2%f2fschemeApi%2fstartApp%3fbundleId%3d2000118%26version%3d1.5.1 is a parameter in the link and a URI obtained after URL encoding(zmVerify://schemeApi/startApp?bundleId=2000118&version=1.5.1 is obtained after URL decoding). zmVerify indicates the ZMCertification APP. For the ALIPAY Wallet APP, an example is as follows: alipay://schemeApi/startApp?bundleId=2000118&version=1.5.1. A system can use the scheme of zmVerify to locate an APP that makes the statement and invoke the APP. schemeApi, startapp, bundleID, version, etc. are all optional parameters. schemeApi is equivalent to a domain of a domain name, for example, qq.com or alipay.com. For startapp, bundleID, version, or more other similar parameters, the second APP can process these parameters based on a service requirement, for example, opening a certain web page, playing a piece of music, or sending a notification.

After the link address in the SMS APP is triggered and opened, a default browser APP can be enabled to open the link address. In an opening process, the browser APP of a terminal device can parse out the URI in the link address, and access a corresponding link resource based on an APP identified by the URI. The browser of the terminal device can combine and obtain the URI by parsing JS code in web page data.

For example, if the APP identified by the URI is the ALIPAY APP, a system application programming interface (API) can be used to invoke the corresponding ALIPAY APP, and the resource described by the link address above can be accessed in the ALIPAY APP. Similarly, if the APP identified by the URI is the TAOBAO APP, a system API can be used to invoke the corresponding TAOBAO APP, and the resource described by the link address above can be opened in the TAOBAO APP.

In the previously described example, the default browser APP is the first local APP in S110, the ALIPAY APP or TAOBAO APP that is invoked is the second local APP.

Similarly, the first local APP can be an APP that integrates the WebView component, for example, a certain shopping APP. The shopping APP integrates WebView and can open a certain link by using the integrated WebView APP. Because the WebView component that can implement a web page browsing function is integrated, the default browser APP does not necessarily need to be enabled during the process.

The previously described first local APP and second local APP reside in different processes, and therefore cannot communicate with each other directly.

S120: The second local APP starts a local server.

In this implementation of the present application, after being invoked, the second local APP can start a local server. The local server can be a Hypertext Transfer Protocol (HTTP) server, and can receive and respond to an HTTP request (for example, an HTTP GET request). A software program can be used to set and start a server. Such content has been widely applied in the existing technology, and details are omitted for simplicity. For example, an address of the local server can be 127.0.0.1:prot. 127.0.0.1 is also referred to as a loopback address that is pointed to the local server and is generally used for testing. Once an APP or a program uses the loopback address to send data, protocol software immediately returns corresponding information, which is not transmitted over the network.

In addition, after being invoked, the second local APP can access the resource corresponding to the previously described link address so that the second local APP provides a user with browsing or other operations.

S130: The first local APP sends a JS reference request to the local server.

The first local APP can send a JS reference request to the started local server.

The JS reference request sent in this implementation of the present application uses the JSON with Padding (JSONP) technology. JSONP is an information format and is a JSON "usage mode" that allows a web page to obtain information from other network domains. In addition, JSONP can achieve cross-origin resource sharing. Due to the same origin policy, generally, a web page in server1.example.com cannot communicate with a server outside server1.example.com. However, a <script> element in the Hypertext Markup Language (HTML) is an exception. With the open policy, namely, the <script> element, the web page can obtain data information dynamically generated by other origins. Such usage mode is JSONP.

In this implementation of the present application, an example of the JS reference request sent by the first local APP is as follows:

<script>http://127.0.0.1:8888/a.js</script>

<script><script> is a dynamically added tag, indicating a JS reference request. 127.0.0.1 is the address of the local device, that is, the address of the started local server. 8888 is a port number, and is generally a default value. The port number used can alternatively be another port number that is pre-negotiated by the first local APP with the local server that is started by the second local APP.

The first local APP can send, to the local server, a JS reference request that is raised by dynamically adding a <script> tag to the web page and that includes the address of the local server.

S140: The first local APP stops jumping to a directed download page if receiving a response returned by the local server.

After the second local APP starts the local server, the local server can respond to a request sent by another APP even if another APP and the second local APP reside in different processes.

As such, the local server can return the response if receiving the JS reference request sent by the first local APP. The response can be any type of response, or a response pre-negotiated based on services. For the latter, if the first local APP receives the response returned by the local server and the response satisfies the pre-negotiated response, the first local APP can determine that the invoked second local APP has started the local server. In other words, the second local APP has been invoked, and the first local APP does not need to jump to a certain directed download page. Further, the first local APP can stop jumping to the directed download page.

The first local APP receives, in a predetermined response time period, the response returned by the local server. In other words, the first local APP stops jumping to the directed download page if receiving, in the predetermined response time period, the response returned by the local server.

In addition, the first local APP can jump to the directed download page if the first local APP does not receive, in the predetermined response time period, the response returned by the local server. The directed download page to be jumped to can be specified in web page logic. In addition, as such settings have been implemented in the existing technology, details are omitted for simplicity.

The port can be one of a group of pre-negotiated port numbers. For example, a port on the local server started by the second local APP in S120 is one of a group of ports. The group of ports include 8888, 8889, and 8890. A port in the JS reference request sent by the first local APP in S130 can also be one of the group of ports. Initially, the default port can be 8888. As such, the port on the local server started by the second local APP in S120 is port 8888, and the port in the JS reference request sent by the first local APP in S130 is also port 8888. Therefore, the local server can receive the JS reference request. Port 8888 sometimes may be occupied by another APP. In this case, when starting the local server in S120, the second local APP can find that port 8888 has been occupied and turn to port 8889. As a result, when the first local APP sends the JS reference request by using port 8888 in S130, the local server cannot receive the JS reference request. In the predetermined duration, for example, 20 ms, if the first local APP does not receive the response returned by the local server, the first local APP can turn to another port in the predetermined port group to send the JS reference request again. After sending the JS reference request again, the first local APP can stop jumping to the directed download page when receiving, in the predetermined duration, the response returned by the local server. The first local APP can jump to the directed download page if the first local APP does not receive the response returned by the local server in the predetermined response time period by using ports in the predetermined port group.

The previously described predetermined duration can be less than the predetermined response time period. For example, the predetermined duration is 20 ms while the predetermined response time period is 100 ms. As such, even if a certain port on the started local server has been occupied, another port can be used. For example, when a first port number in a group of pre-negotiated port numbers has been occupied, a second port number in the group of pre-negotiated port numbers can be set. Correspondingly, the first local APP sends the JS reference request by using the first port number, and can send the JS reference request by using the second port number in the group of pre-negotiated port numbers if the first local APP does not receive, in first predetermined duration, the response returned by the local server. Similarly, a third and other port numbers in the group of pre-negotiated port numbers can further be used between the started server and the first local APP, and details are omitted for simplicity. The predetermined duration can be less than the predetermined response time period so that the first local APP can try as many port numbers in the predetermined port numbers as possible. As such, after sending the JS reference request by using any port number, the first local APP can confirm that the second local APP has been started if obtaining the response returned by the local server. Consequently, the first local APP can stop jumping to the directed download page.

The present application further provides a system implementation for starting an APP, including the following: a first local APP, configured to open a web page and invoke a second local APP; further configured to send a JS reference request to the local server; and further configured to stop jumping to a directed download page when receiving a response returned by the local server; the second local APP, configured to start the local server; and the local server, configured to receive the JS reference request sent by the first local APP, and return the response to the first local APP when receiving the JS reference request.

Preferably, when a link address of the web page is triggered and opened, the first local APP opens the corresponding web page, where the first local APP includes a browser APP or a local APP that integrates the WebView component.

Preferably, when a link address of the web page is triggered and opened, the first local APP combines parameters included in the address of the web page into a URI, and invokes and opens the second local APP corresponding to the URI.

Preferably, the first local APP sends the JS reference request to the local server, including: the first local APP sends, to the local server, a JS reference request that is triggered by dynamically adding a <script> tag to an address of the local server and that includes the address of the local server.

Preferably, the JS reference request sent by the first local APP includes a port number, and the port number is a default value or a port number that is pre-negotiated by the first local APP with the local server that is started by the second local APP.

Preferably, the second local APP sets the port number to a first port number in a group of pre-negotiated port numbers in a process of starting the local server; and the JS reference request sent by the first local APP includes the first port number in the group of pre-negotiated port numbers.

Preferably, the second local APP starts the local server, and sets the port number to a second port number in the group of pre-negotiated port numbers, if the first port number that is set has been occupied; and the first local APP sends the JS reference request by using the first port number, and sends the JS reference request by using the second port number in the group of pre-negotiated port numbers, if the first local APP does not receive, in predetermined duration, the response returned by the local server.

Preferably, the first local APP stops jumping to the directed download page if receiving the response returned by the local server including:the first local APP stops jumping to the directed download page if receiving, in a predetermined response time period, the response returned by the local server.

Preferably, the first local APP jumps to the directed download page if the first local APP does not receive, in the predetermined response time period, the response returned by the local server.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, improvements in many current method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. A memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, such controller can be considered as a hardware component, and an apparatus configured to implement various functions in the controller can also be considered as a structure in the hardware component. Or, the device configured to implement various functions can even be considered as both a software module implementing the method and a structure in the hardware component.

The system, device, module, or unit illustrated in the previous implementations can be implemented by using a computer chip or an entity, or can be implemented by using a product having a certain function.

For ease of description, the apparatus above is described by dividing functions into various units. Certainly, when the present application is implemented, a function of each unit can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction apparatus. The instruction apparatus implements a specific function in one or more flows in the flowcharts and/or in one or more blocks in the block diagrams.

These computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory may include a non-persistent memory, a random access memory (RAM), a non-volatile memory, and/or another form in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a phase change random-access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be configured to store information that a computing device can access. Based on the definition in the present specification, the computer readable medium does not include transitory computer-readable media (transitory media), for example, a modulated data signal and carrier.

It is worthwhile to further note that the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such process, method, article, or device. An element preceded by "includes a . . . " does not, without more constraints, preclude the existence of additional identical elements in the process, method, article, or device that includes the element.

A person skilled in the art should understand that an implementation of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts in the implementations, refer to the implementations. Each implementation focuses on a difference from other implementations. Particularly, a system implementation is basically similar to a method implementation, and therefore, is described briefly. For related parts, refer to related descriptions in the method implementation.

The previous descriptions are merely implementations of the present application, and are not intended to limit the present application. For a person skilled in the art, the present application can have various modifications and changes. Any modifications, equivalent substitutions, improvements, etc. made in the spirit and principle of the present application shall fall within the scope of the claims in the present application.

Figure 2:
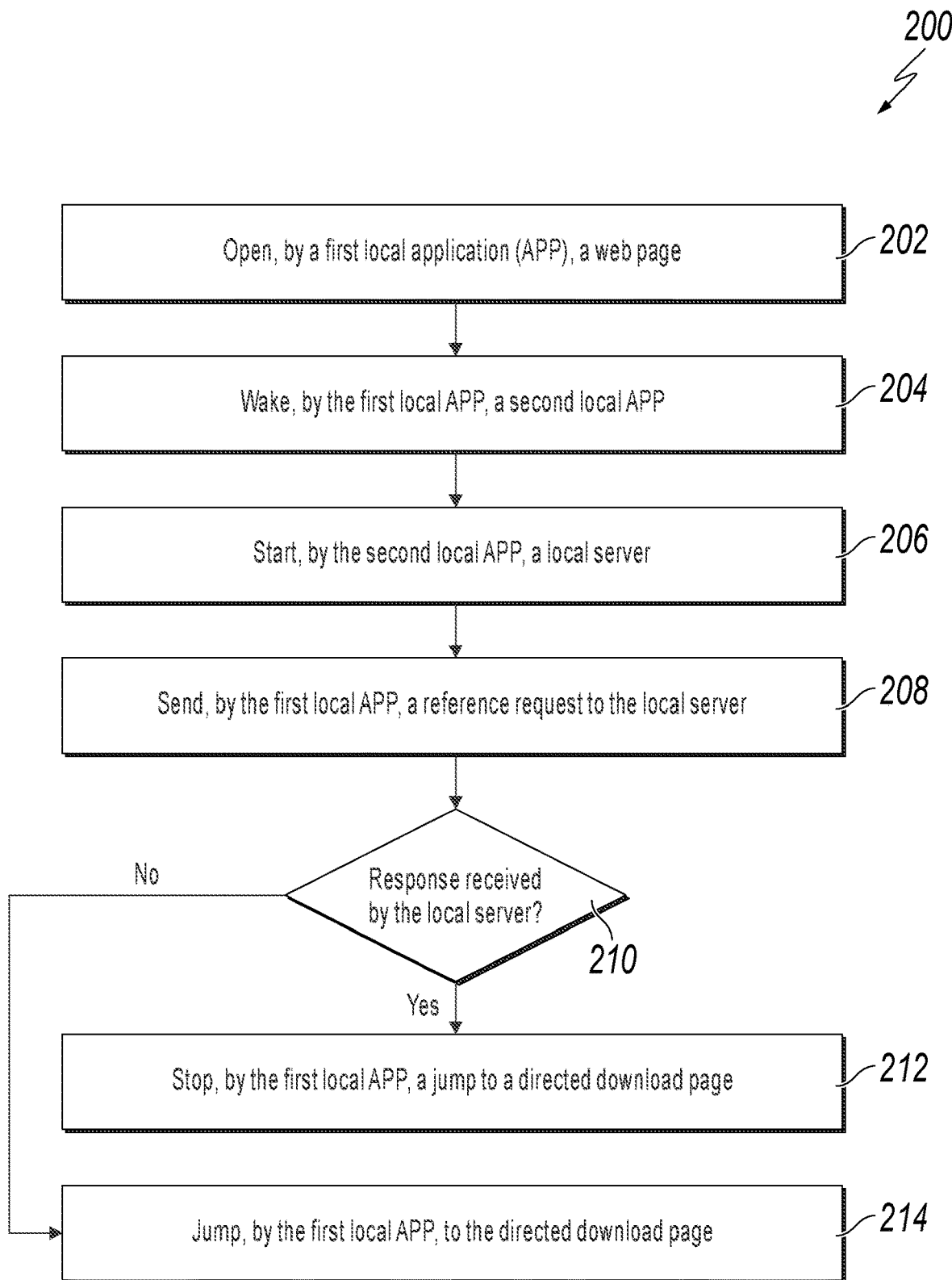
FIG. 2 is a flowchart illustrating an example of a computer-implemented method for starting an application so that an opened page can confirm that a corresponding application has been installed on a terminal device where the opened page resides, according to an implementation of the present disclosure.

FIG. 2 is a flowchart illustrating an example of a computer-implemented method 200 for starting an application so that an opened page can confirm that a corresponding application has been installed on a terminal device where the opened page resides, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, a first local application (APP) opens a web page. In some implementations, when a link address of the web page is triggered and opened, the first local APP opens the corresponding web page, where the first local APP includes a browser APP or a local APP that integrates a WebView component. In some implementations, when a link address of the web page is triggered and opened, the first local app combines parameters including an address of the web page into a uniform resource identifier (URI) and invokes and opens the second local APP corresponding to the URI. In some implementations, the reference request is a JavaScript (JS) reference request and the first local APP sends the reference request to the local server, the sending comprising sending the reference request to the local server through JavaScript Object Notation (JSON) with Padding (JSONP). In some implementations, the first local APP sending the reference request to the local server includes the first local APP sending, to the local server, the reference request that is raised by dynamically adding a <script>tag to the web page and including an address of the local server, where the reference request is a JavaScript (JS) reference request. In some implementations, the reference request sent by the first local APP includes a port number, where the port number is a default value or a port number that is pre-negotiated by the first local APP with the local server that is started by the second local APP. From 202, method 200 proceeds to 204.

At 204, the first local APP wakes a second local APP. From 204, method 200 proceeds to 206.

At 206, the second local APP starts a local server. From 206, method 200 proceeds to 208.

At 208, the first local APP sends a reference request to the local server. In some implementations, the second local app sets the port number to a first port number in a group of pre-negotiated port numbers, where the reference request sent by the first local APP comprises the first port number in the group of pre-negotiated port numbers. In some implementations, method 200 further includes: starting, by the second local APP, the local server; setting, by the second local APP, the port number to a second port number in the group of pre-negotiated port numbers if the first port number that is set has been occupied; sending, by the first local APP, the reference request by using the first port number; and sending, by the first local APP, the reference request by using the second port number in the group of pre-negotiated port numbers if the first local APP does not receive, in a predetermined response time period, the response returned by the local server. From 208, method 200 proceeds to 210.

At 210, a determination is made as to whether a response is received by the local server. If it is determined that the response is received by the local server, method 200 proceeds to 212. Otherwise, if it is determined that the response is not received by the local server, method 200 proceeds to 214. From 210, method 200 proceeds to 212.

At 212, the first local APP stops a jump to a directed download page. In some implementations, the jump to the directed download page is stopped if the response returned by the local server is received in a predetermined response time period. After 212, method 200 can stop.

At 214, the first local APP performs a jump to a directed download page. After 214, method 200 can stop.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    opening, by a first local application (APP) installed on a local device, a web page, wherein a system of the local device invokes a second local APP;
    determining, by the first local APP, that the second local APP is installed on the local device, comprising:
        sending, by the first local APP, a reference request to a local server on the local device through a predetermined address that is known to the first local APP, wherein the local server is started by the second local APP if and only if the second local APP has been installed on the local device, wherein the local server is configured to respond to the reference request sent by the first local APP, wherein the first APP and the second APP execute in different processes on the local device;
        receiving, by the first local APP, a response sent by the local server;
        determining, by the first local APP, that the response sent by the local server is received within a predetermined response time period; and
        in response to determining that the response sent by the local server is received within the predetermined response time period, determining, by the first local APP, that the second local APP is installed on the local device; and
    in response, bypassing, by the first local APP, a jump to a direct download page to download the second local APP.

2. The computer-implemented method of claim 1, wherein opening, by the first local APP, the web page comprises:
    determining that a link address of the web page is triggered and opened; and
    in response, opening the web page, wherein the first local APP comprises a browser APP or a local APP that integrates a WebView component.

3. The computer-implemented method of claim 1, wherein opening, by the first local APP, the web page comprises:
    determining that a link address of the web page is triggered and opened; and
    in response, combining, by the first local APP, parameters comprising an address of the web page into a uniform resource identifier (URI); and
    invoking the second local APP corresponding to the URI.

4. The computer-implemented method of claim 1, wherein:
    the reference request is a reference request implemented in an interpreted scripting language; and
    sending, by the first local APP, the reference request to the local server comprises sending the reference request to the local server through JavaScript Object Notation (JSON) with Padding (JSONP).

5. The computer-implemented method of claim 1, wherein the sending, by the first local APP, the reference request to the local server comprises:
    sending, by the first local APP to the local server, the reference request that is raised by dynamically adding a <script> tag to the web page and that comprises the predetermined address of the local server, wherein the reference request is a reference request implemented in an interpreted scripting language.

6. The computer-implemented method of claim 1, further comprising:
   in response to determining that the response sent by the local server is not received in the predetermined response time period, jumping, by the first local APP, to the directed download page.

7. A non-transitory, computer-readable medium storing one or more instructions executable by a computer system to perform operations comprising:
   opening, by a first local application (APP) installed on a local device, a web page, wherein a system of the local device invokes a second local APP;
   determining, by the first local APP, that the second local APP is installed on the local device, comprising:
      sending, by the first local APP, a reference request to a local server on the local device through a predetermined address that is known to the first local APP, wherein the local server is started by the second local APP if and only if the second local APP has been installed on the local device, wherein the local server is configured to respond to the reference request sent by the first local APP, wherein the first APP and the second APP execute in different processes on the local device;
      receiving, by the first local APP, a response sent by the local server;
      determining, by the first local APP, that the response sent by the local server is received within a predetermined response time period; and
      in response to determining that the response sent by the local server is received within the predetermined response time period, determining, by the first local APP, that the second local APP is installed on the local device; and
   in response, bypassing, by the first local APP, a jump to a direct download page to download the second local APP.

8. The non-transitory, computer-readable medium of claim 7, wherein opening, by the first local APP, the web page comprises:
   determining that a link address of the web page is triggered and opened; and
   in response, opening the web page, wherein the first local APP comprises a browser APP or a local APP that integrates a WebView component.

9. The non-transitory, computer-readable medium of claim 7, wherein opening, by the first local APP, the web page comprises:
   determining that a link address of the web page is triggered and opened; and
   in response, combining, by the first local APP, parameters comprising an address of the web page into a uniform resource identifier (URI); and
   invoking the second local APP corresponding to the URI.

10. The non-transitory, computer-readable medium of claim 7, wherein:
   the reference request is a reference request implemented in an interpreted scripting language; and
   sending, by the first local APP, the reference request to the local server comprises sending the reference request to the local server through JavaScript Object Notation (JSON) with Padding (JSONP).

11. The non-transitory, computer-readable medium of claim 7, wherein the sending, by the first local APP, the reference request to the local server comprises:
   sending, by the first local APP to the local server, the reference request that is raised by dynamically adding a <script> tag to the web page and that comprises the predetermined address of the local server, wherein the reference request is a reference request implemented in an interpreted scripting language.

12. The non-transitory, computer-readable medium of claim 7, the operations further comprise:
   in response to determining that the response sent by the local server is not received in the predetermined response time period, jumping, by the first local APP, to the directed download page.

13. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      opening, by a first local application (APP) installed on a local device, a web page, wherein a system of the local device invokes a second local APP;
      determining, by the first local APP, that the second local APP is installed on the local device, comprising:
         sending, by the first local APP, a reference request to a local server on the local device through a predetermined address that is known to the first local APP, wherein the local server is started by the second local APP if and only if the second local APP has been installed on the local device, wherein the local server is configured to respond to the reference request sent by the first local APP, wherein the first APP and the second APP execute in different processes on the local device;
         receiving, by the first local APP, a response sent by the local server;
         determining, by the first local APP, that the response sent by the local server is received within a predetermined response time period; and
         in response to determining that the response sent by the local server is received within the predetermined response time period, determining, by the first local APP, that the second local APP is installed on the local device; and
      in response, bypassing, by the first local APP, a jump to a direct download page to download the second local APP.

14. The computer-implemented system of claim 13, wherein opening, by the first local APP, the web page comprises:
   determining that a link address of the web page is triggered and opened; and
   in response, opening the web page, wherein the first local APP comprises a browser APP or a local APP that integrates a WebView component.

15. The computer-implemented system of claim 13, wherein opening, by the first local APP, the web page comprises:
   determining that a link address of the web page is triggered and opened; and
   in response, combining, by the first local APP, parameters comprising an address of the web page into a uniform resource identifier (URI); and
   invoking the second local APP corresponding to the URI.

16. The computer-implemented system of claim 13, wherein:
the reference request is a reference request implemented in an interpreted scripting language; and
sending, by the first local APP, the reference request to the local server comprises sending the reference request to the local server through JavaScript Object Notation (JSON) with Padding (JSONP).

17. The computer-implemented system of claim 13, wherein the sending, by the first local APP, the reference request to the local server comprises:
sending, by the first local APP to the local server, the reference request that is raised by dynamically adding a<script>tag to the web page and that comprises the predetermined address of the local server, wherein the reference request is a reference request implemented in an interpreted scripting language.

18. The computer-implemented system of claim 13, the operations further comprise:
in response to determining that the response sent by the local server is not received in the predetermined response time period, jumping, by the first local APP, to the directed download page.

\* \* \* \* \*